(12) United States Patent
Mohri et al.

(10) Patent No.: US 6,376,793 B1
(45) Date of Patent: Apr. 23, 2002

(54) METHOD AND DEVICE FOR ELECTRIC DISCHARGE SURFACE TREATMENT USING A WIRE ELECTRODE

(75) Inventors: Naotake Mohri, Tounoyama-jyuutaku 101, 1-50-3, Cyuuou, Nakano-ku, Tokyo (JP), 164-0011; Katsushi Furutani; Mamoru Kosuge, both of Nagoya (JP); Takahisa Masuzawa, Mitaka (JP); Masayuki Suzuki, Takahama (JP); Manabu Yoshida, Tokyo (JP); Akihiro Goto, Tokyo (JP); Toshio Moro, Tokyo (JP)

(73) Assignees: Mitsubishi Denki Kabushiki Kaisha; Naotake Mohri, both of Tokyo (JP)

( * ) Notice: Subject to any disclaimer, the term of this patent is extended or adjusted under 35 U.S.C. 154(b) by 0 days.

(21) Appl. No.: 09/630,144

(22) Filed: Jul. 31, 2000

(30) Foreign Application Priority Data

Mar. 8, 2000 (JP) ........................................ 2000-063468

(51) Int. Cl.$^7$ ................................................. B23H 1/00
(52) U.S. Cl. ................................ 219/69.12; 219/69.17; 219/76.13
(58) Field of Search ........................... 219/69.12, 69.17, 219/76.13; 427/540, 580

(56) References Cited

U.S. PATENT DOCUMENTS

| 4,287,404 A | * | 9/1981 | Convers et al. ........... 219/69.12 |
| 5,231,270 A | * | 7/1993 | Groas et al. ............. 219/69.12 |
| 5,315,087 A | * | 5/1994 | Itoh ........................ 219/69.12 |
| 5,616,260 A | * | 4/1997 | Masicovetere et al. .. 219/69.12 |

FOREIGN PATENT DOCUMENTS

| JP | 5-148615 | 6/1993 |
| JP | 9-19829 | 1/1997 |
| JP | 9-192937 | 7/1997 |
| JP | PCT/JP99/02379 | 5/1999 |

\* cited by examiner

Primary Examiner—Geoffrey S. Evans
(74) Attorney, Agent, or Firm—Sughrue Mion, PLLC

(57) ABSTRACT

An electric discharge is generated between an electric discharge surface treatment electrode and a wire electrode, and an electric discharge surface treatment material is stuck on the surface of the wire electrode by the energy of the electric discharge. An electric discharge is then generated between a work piece and the wire electrode on which the electric discharge surface treatment material is stuck, and a surface modified layer is formed on the surface of the work piece by the energy of the electric discharge.

6 Claims, 9 Drawing Sheets

ELECTRODE MOVEMENT PASS P

ELECTRODE MOVEMENT PASS P

METHOD AND DEVICE FOR ELECTRIC DISCHARGE SURFACE TREATMENT USING A WIRE ELECTRODE

FIELD OF THE INVENTION

The present invention relates to an improvement in the a machining method utilizing a wire electrode of performing electric discharge surface treatment or grinding with respect to a work piece.

BACKGROUND OF THE INVENTION

As a technique for imparting a corrosion resistance and a wear resistance through a formation of a surface modified layer in a work piece through a submerged electric discharge, there is, for example, the electric discharge surface treatment as disclosed in Japanese Patent Application Laid-Open (JP-A) No. 5-148615. This technique is an electric discharge surface treatment method for metallic material, comprising two steps in which a primary machining (piling) is executed, using a green compact electrode made by a compression molding of WC powder and Co powder or the like, and then a secondary machining (re-welding) is executed by exchanging the electrode with an electrode with a relatively low electrode exhaustion such as a copper electrode. Therefore, this conventional art can form a surface modified layer with a high hardness and a large adherence for steel.

Further, in Japanese Patent Application Laid-Open (JP-A) No. 9-192937, an electric discharge surface treatment method is disclosed in which a solid surface modified layer is formed on a surface of iron steel and sintered hard alloy or the like without a re-welding process, using a green compact electrode made by a compression molding of TiH2 powder.

In the case in which the electric discharge surface treatment technique is applied to a die, the lifetime of the die may be largely improved by the improvement in the corrosion and wear resistances.

In the case in which the electric discharge surface treatment is executed for a work piece, using a form electrode as in the conventional art, for example, as shown in FIG. 9A, when an electric discharge surface treatment is executed at an electric discharge surface treatment electrode 27 for a first work piece 26, an exhaustion part 27a is formed in the electric discharge surface treatment electrode 27, and a surface modified part 28a is formed in the first work piece 26. As shown in FIG. 9B, when an electric discharge surface treatment is executed for a second work piece 29 with a different size from the first work piece 26 at the electric discharge surface treatment electrode 27 through which the electric discharge surface treatment of the first work piece 26 is executed, exhaustion parts 27b, 27c are formed in the electric discharge surface treatment electrode 27, and a surface modified layer 30 is formed in the second work piece 29. There is a problem that a non-uniformity is generated in the thickness of the surface modified layer 30 as shown in FIG. 9B, whereby a uniform surface modified layer may not be formed.

Further, a problem exists in which there is a necessity to prepare a plurality of electric discharge surface treatment electrodes corresponding to work shapes.

In order to solve these problems, it may be thought that a surface modified material or a material to be the source of the surface modified material is employed as the wire electrode itself, and by this wire electrode an electric discharge surface treatment is executed for a work piece. However, for example, the case in which Ti, W or the like is employed as a wire electrode is not practical since the electric discharge surface treatment speed is slow. Further, that a wire electrode is formed by a green compact is not practical at all since the tensile strength of the wire electrode may not be ensured.

SUMMARY OF THE INVENTION

It is an object of this invention to obtain a machining method utilizing a wire electrode and the device thereof which is suitable for a partial surface modification, specifically for a die or the like, and in which a uniform surface modified layer of predetermined characteristics may be formed to a work piece by a practical electric discharge surface treatment speed.

It is another object of this invention to obtain a machining method utilizing a wire electrode and the device thereof in which there is no necessity to prepare a plurality of electric discharge surface treatment electrodes corresponding to machining shapes.

It is still another object of this invention to obtain a machining method utilizing a wire electrode and the device thereof in which the surface roughness of a work piece such as a die may be made small through a grinding utilizing a wire electrode provided with an electric discharge surface treatment so that a high resolution of the work piece may be obtained.

According to one aspect of this invention, in a first step, an electric discharge is generated between a wire electrode and an electric discharge surface treatment electrode made of metal powder or a mixture of metal compound power or ceramic material powder or these types of powder, and a surface modified material or a material to be the source of the surface modified material is stuck on the surface of the wire electrode by the energy of the electric discharge. In a second step, an electric discharge is generated between a work piece and the covered wire electrode on which the surface modified material or the material to be the source of the surface modified material is stuck, and a surface modified layer is formed on the surface of the work piece by the energy of the electric discharge.

According to another aspect of this invention, in a first step, an electric discharge is generated between a wire electrode and an electric discharge surface treatment electrode made of metal powder or a mixture of metal compound power or ceramic material powder or these types of powder, and a hard coating is stuck on the surface of the wire electrode by the energy of the electric discharge. In a second step, a grinding is executed for a work piece by means of the covered wire electrode to which the hard coating is stuck.

Further, wherein the first step is executed while the wire electrode and the electric discharge surface treatment electrode are relatively swung inside a vertical plane of a feed direction of the wire electrode.

According to still another aspect of this invention, a wire electrode feed unit feeds a wire electrode to a work piece. An electric discharge surface treatment electrode is composed of metal powder or a mixture of metal compound power or ceramic material powder or these types of powder. A drive unit relatively moves the wire electrode to the work piece. An electric discharge generation unit supplies machining power between the electric discharge surface treatment electrode and the wire electrode and between the wire electrode and the work piece.

According to still another aspect of this invention, a wire electrode feed unit feeds a wire electrode to a work piece. An electric discharge surface treatment electrode composed of metal powder or a mixture of metal compound power or ceramic material powder or these types of powder. A drive unit relatively moves the wire electrode to the work piece. An electric discharge generation unit supplies machining power between the electric discharge surface treatment electrode and the wire electrode.

According to still another aspect of this invention, a wire electrode feed unit feeds the wire electrode to a work piece. An electric discharge surface treatment electrode composed of metal powder or a mixture of metal compound power or ceramic material powder or these types of powder. A first drive unit relatively moves the electric discharge surface treatment electrode to the wire electrode inside a vertical plane of a feed direction of the wire electrode by the wire electrode feed unit. A second drive unit relatively moves the wire electrode to the work piece. An electric discharge generation unit supplies machining power between the electric discharge surface treatment electrode and the wire electrode and between the wire electrode and the work piece.

According to still another aspect of this invention, a wire electrode feed unit feeds a wire electrode to a work piece. An electric discharge surface treatment electrode composed of metal powder or a mixture of metal compound power or ceramic material powder or these types of powder. A first drive unit relatively moves the electric discharge surface treatment electrode to the wire electrode inside a vertical plane of a feed direction of the wire electrode by the wire electrode feed unit. A second drive unit relatively moves the wire electrode to the work piece. An electric discharge generation unit supplies machining power between the electric discharge surface treatment electrode and the wire electrode.

Other objects and features of this invention will become understood from the following description with reference to the accompanying drawings.

Other objects and features of this invention will become apparent from the following description with reference to the accompanying drawings.

DESCRIPTION OF THE PREFERRED EMBODIMENTS

Figure 1:
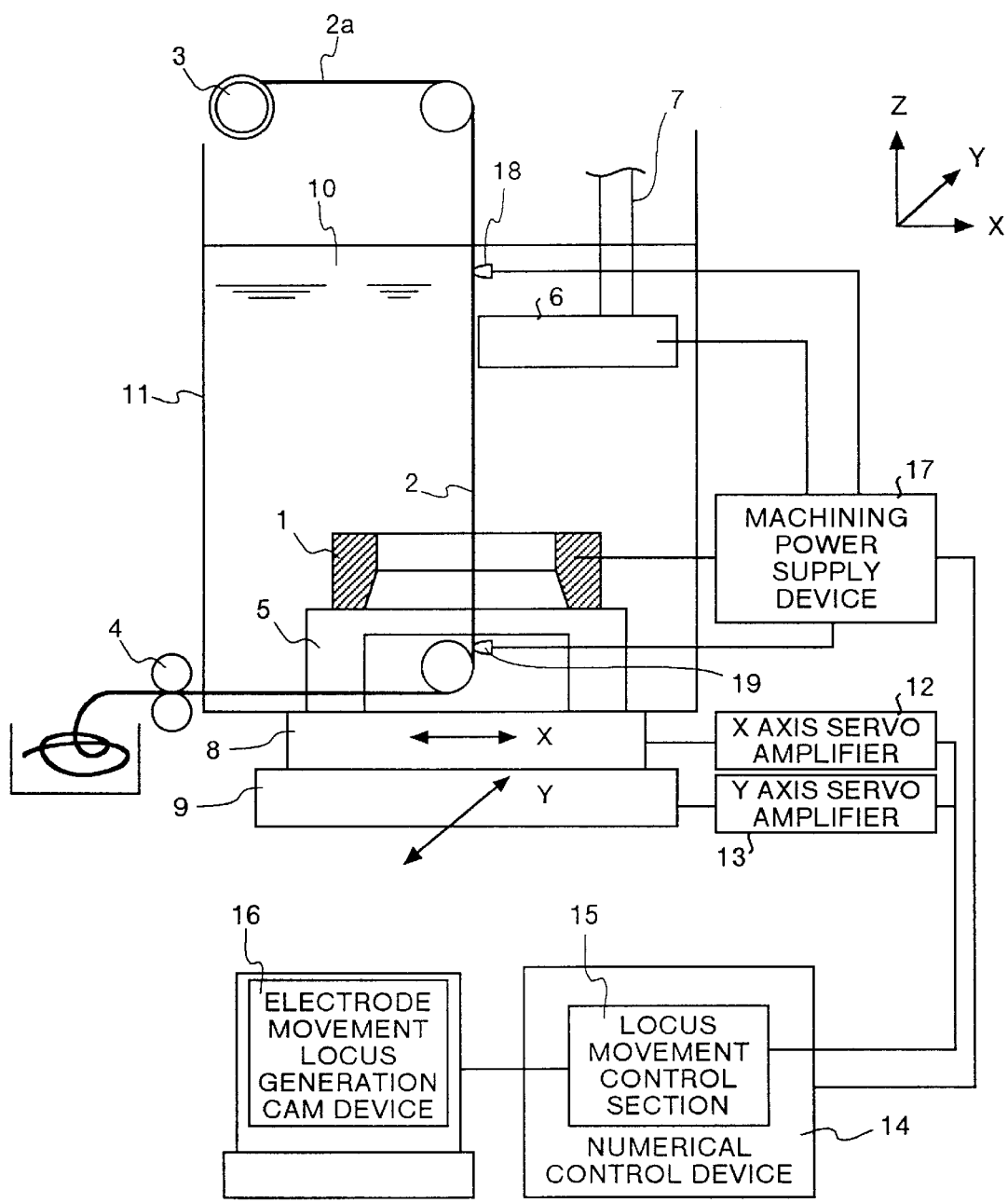
FIG. 1 is a block diagram showing a machining device utilizing a wire electrode according to a first embodiment of the present invention.

FIG. 1 is a block diagram showing a machining device utilizing a wire electrode according to a first embodiment of the present invention. In FIG. 1, 1 is a work piece, 2a is a wire electrode made of a ductile material such as brass, 2 is a covered wire electrode in which a surface modified material or a material to be the source of the surface modified material is stuck on the surface of the wire electrode 2a, 3 is a supply reel supplying a wire electrode 2a, 4 is a take-up reel reeling the covered wire electrode 2, 5 is a surface plate which fixes the work piece 1, 6 is an electric discharge surface treatment electrode made of metal powder or a mixture of metal compound power or ceramic material powder or these types of powder, and 7 is a support member for the electric discharge surface treatment electrode 6, and the electric discharge surface treatment electrode 6 is arranged so as to have a predetermined space with the wire electrode 2a. Further, 8 is an X table which drives the work piece 1 in an X axis direction, 9 is a Y table which drives the work piece 1 in a Y axis direction, 10 is machining liquid, 11 is a machining tank reserving the machining liquid 10, 12 is an X axis servo amplifier for an X axis drive motor that is not shown to drive the X table 8, 13 is a Y axis servo amplifier for a Y axis drive motor that is not shown to drive the Y table 9, 14 is a numerical control device, 15 is a locus movement control section provided inside the numerical control device 14 which controls a relative movement between the covered wire electrode 2 and the work piece 1, 16 is an electrode movement locus generation CAM device supplying an electrode pass program (NC program) for the machining by means of the covered wire electrode 2 to the locus movement control section 15, 17 is a machining power supply device that is an electric discharge generation section, and 18 and 19 are electron supplies. The supply reel 3 and the take-up reel 4 and the like constitute a wire electrode feed section, the X axis drive motor, the X axis servo amplifier 12, and the numerical control device 14 and the like constitute an X axis drive device, and the Y axis drive motor, the Y axis servo amplifier 13, and the numerical control device 14 and the like constitute a Y axis drive device.

Figure 2:
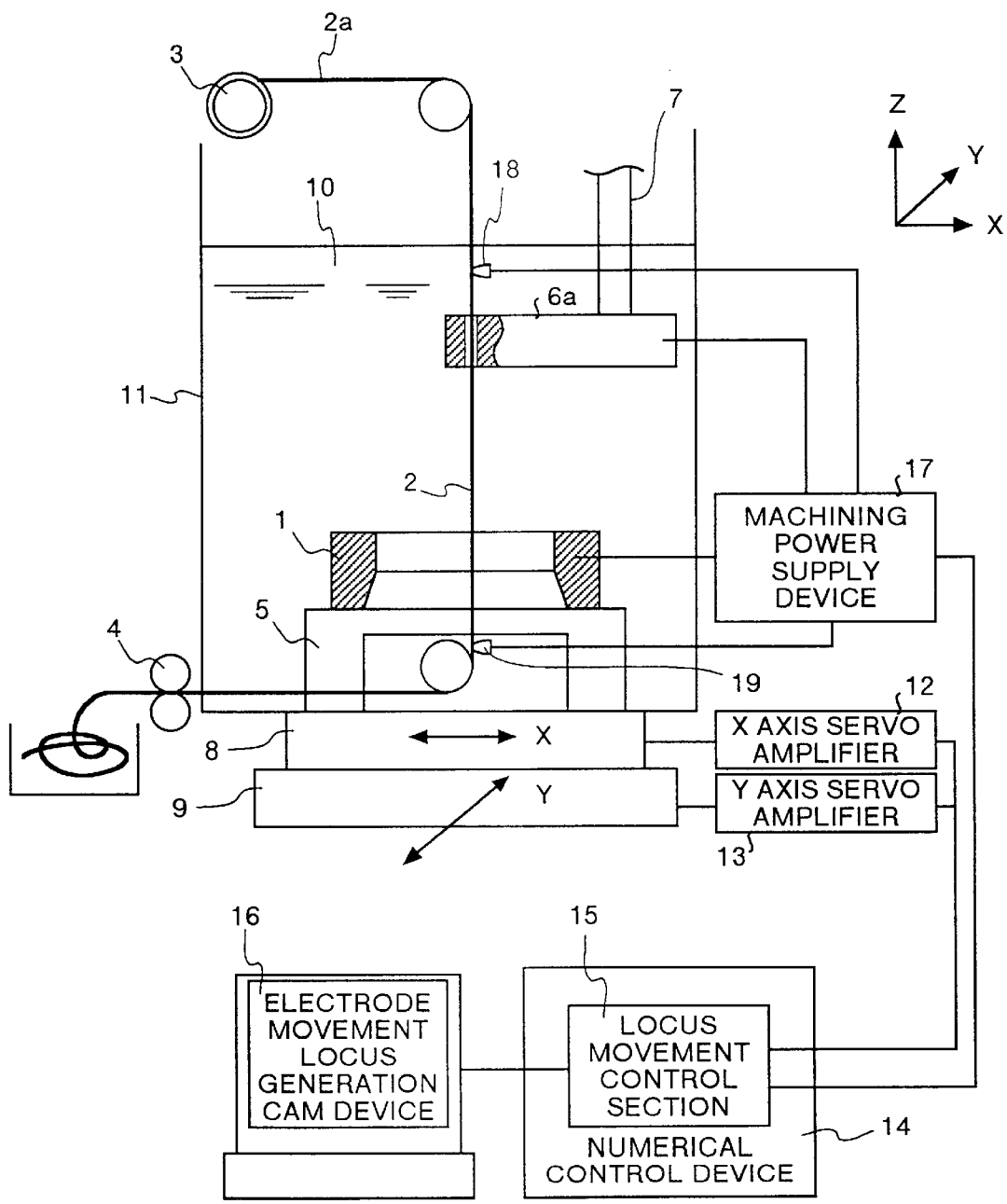
FIG. 2 is a block diagram showing another example of a machining device utilizing a wire electrode according to the first embodiment of the present invention.
Figure 3A:
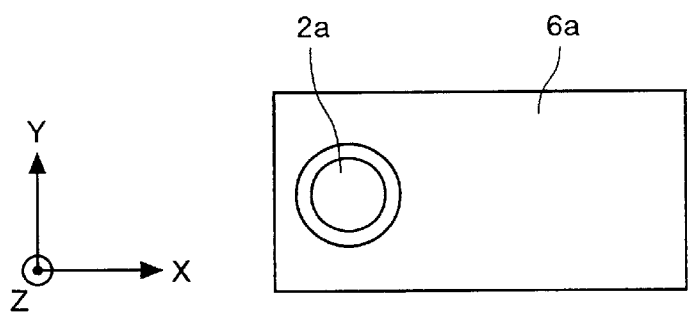
FIG. 3A and FIG. 3B are explanatory views showing constitutions of electric discharge surface treatment electrodes.

FIG. 2 is a block diagram showing another example of a machining device utilizing a wire electrode according to the first embodiment of the present invention. Corresponding numerals to FIG. 1 show the same or similar sections. In FIG. 2, 6a is an electric discharge surface treatment electrode and is arranged so as to have a predetermined space between the whole circumference of the wire electrode 2a and a hole formed in the electric discharge surface treatment electrode 6a, for example, as shown in FIG. 3A.

Figure 3B:
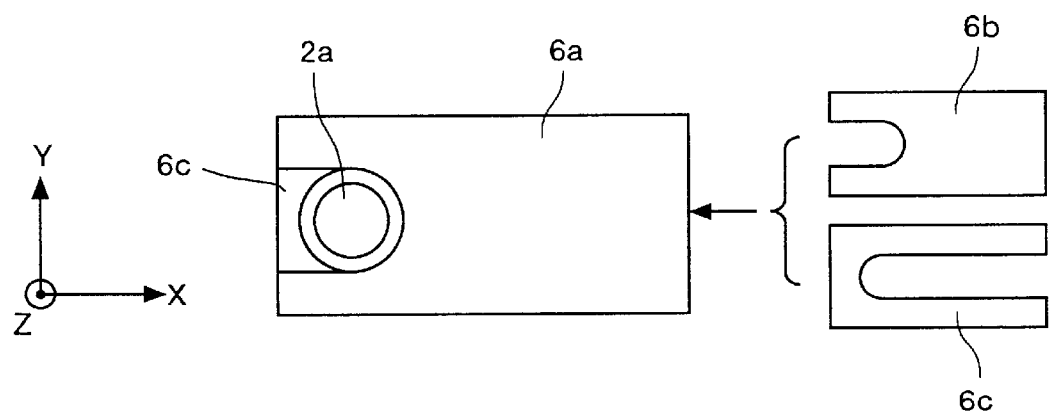

It is possible to constitute so as to have a predetermined space between the electric discharge surface treatment electrode and the whole circumference of the wire electrode 2a by combining the electric discharge surface treatment electrodes 6b, 6c with the shapes as shown in FIG. 3B.

As shown in FIG. 1 or FIG. 2, work power is supplied to the wire electrode 2a and the electric discharge surface treatment electrode 6 or 6a by the electric discharge power supply device 17 so as to generate electric discharge, and a surface modified material or a material to be the source of the surface modified material is stuck on the surface of the wire electrode 2a by the energy of the electric discharge so as to form the covered wire electrode 2.

Figure 4A:
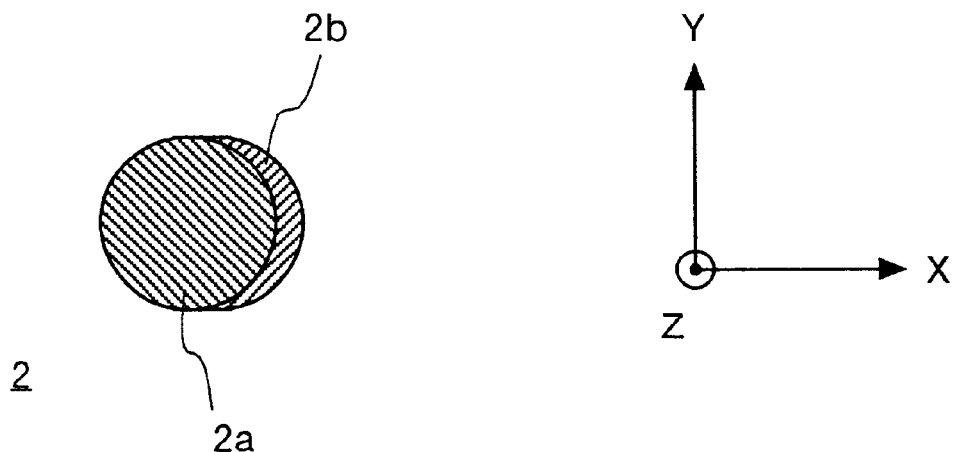
FIG. 4A and FIG. 4B are sectional views showing constitutions of covered wire electrodes.
Figure 4B:
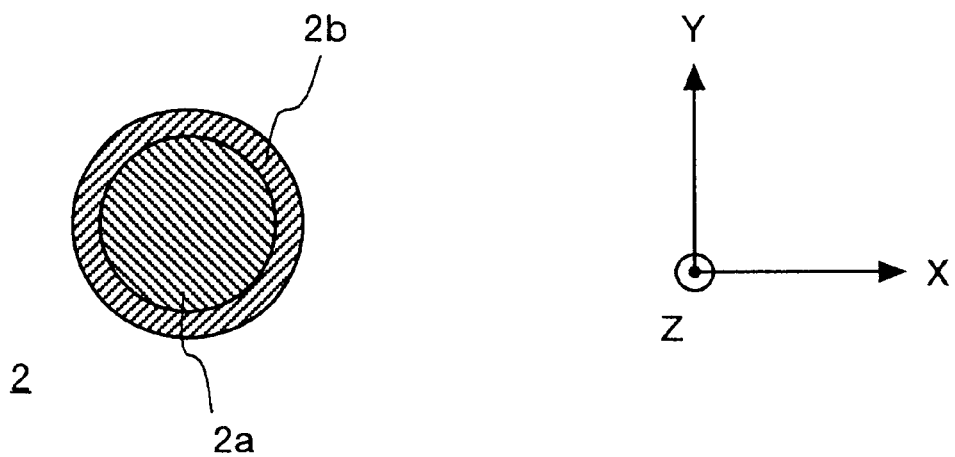

FIG. 4A and FIG. 4B show the constitutions of the covered wire electrode 2. In the figure, 2 is the covered wire electrode, 2a is a wire electrode, and 2b is a surface modified material or a material to be the source of the surface modified material that is an electric discharge surface treatment material stuck on the wire electrode 2a by an electric discharge surface treatment. FIG. 4A shows the case in which the covered wire electrode 2 is formed by the machining device of the wire electrode of the constitution of FIG. 1, and FIG. 4B shows the case in which the covered wire electrode 2 is formed by the machining device of the wire electrode of the constitution of FIG. 2.

The covered wire electrode 2 formed as the above is fed to the work piece 1 by means of the wire electrode feed section such as the supply reel 3, the take-up reel 4 and the like in FIG. 1 or FIG. 2. The relative movement between the covered wire electrode 2 and the work piece 1 is executed by means of the X axis drive device and the Y axis drive device which consists of the drive section, and an electric discharge is generated by supplying machining power to the covered wire electrode 2 and the work piece 1 by the machining power supply device 17 so that by the energy of this electric discharge a surface modified layer may be formed in a predetermined portion of the work piece 1.

It is possible to form a surface modified layer of predetermined characteristics on the work piece 1 by the electric discharge surface treatment material 2b stuck on the wire electrode 2a by a practical treatment speed by employing the covered wire electrode 2 of the constitution.

It might be possible that the covered wire electrode 2 is reeled on the supply reel 3 in advance, and a surface modified layer is formed in the work piece 1 through an electric discharge surface treatment by employing the covered wire electrode 2. However, since there is a necessity to further wind the wire electrode 2a up on the supply reel after an electric discharge surface treatment is executed by means of the electric discharge surface treatment device while a conventional wire electrode 2a reeled on the supply reel 3 is drawing, the cost for the manufacture increases. Further, since a part of the cover of the covered wire electrode 2 is slipped off by winding the covered wire electrode 2 up and drawing to the supply reel 3, bending the covered wire electrode 2 at a guide pulley in a wire run system or the like, a surface modified layer may not be efficiently formed in the work piece 1 in the electric discharge surface treatment employing the covered wire electrode 2.

On the other hand, when the covered wire electrode 2 by the machining device employing the wire electrode of the constitution as shown in FIG. 1 or FIG. 2, and a surface modified layer is formed in the work piece 1 through an electric discharge surface treatment, the conventional wire electrode 2a can be employed. Therefore, the cost can be reduced. Further, since an electric discharge surface treatment can be executed on the work piece 1 immediately after the formation of the covered wire electrode 2, a surface modified layer can be efficiently formed in the work piece 1.

The operation at the time of the electric discharge surface treatment for the work piece 1 will be explained. It is the case in which the work piece 1 is employed as a press die. It is supposed that the work piece 1 is given a work, for example, by a wire electric discharge machining in a process prior to the execution of the electric discharge surface treatment so that the shape of the press die as a cutting blade has already formed. The wire electric discharge machining can be executed by supplying a predetermined machining power to the wire electrode 2a and the work piece 1 through the machining power supply device 17 without forming the covered wire electrode 2 in the machining device by the wire electrode of the constitution of FIG. 1 or FIG. 2.

For example, in FIG. 2, the covered wire electrode 2 is fed to the work piece 1 as a press die, and the electric discharge surface treatment is executed for the cutting blade side face so that a hard surface modified layer is formed in the cutting blade side face. For this process, there is a necessity to control so that the covered wire electrode 2 can be moved according to the cutting blade shape of the work piece 1. The locus movement control section 15 provided inside the numerical control device 14 drive controls the X table 8 and the Y table 9 through the X axis drive device and the Y axis drive device which belong to the drive section based on the electrode pass information previously prepared through the electrode movement locus generation CAM device 16 and executes the relative movement in the XY plane of the covered wire electrode 2 and the work piece 1 so that the locus movement of the covered wire electrode 2 can be executed as tracing the cutting blade shape of the work piece 1.

Figure 5:
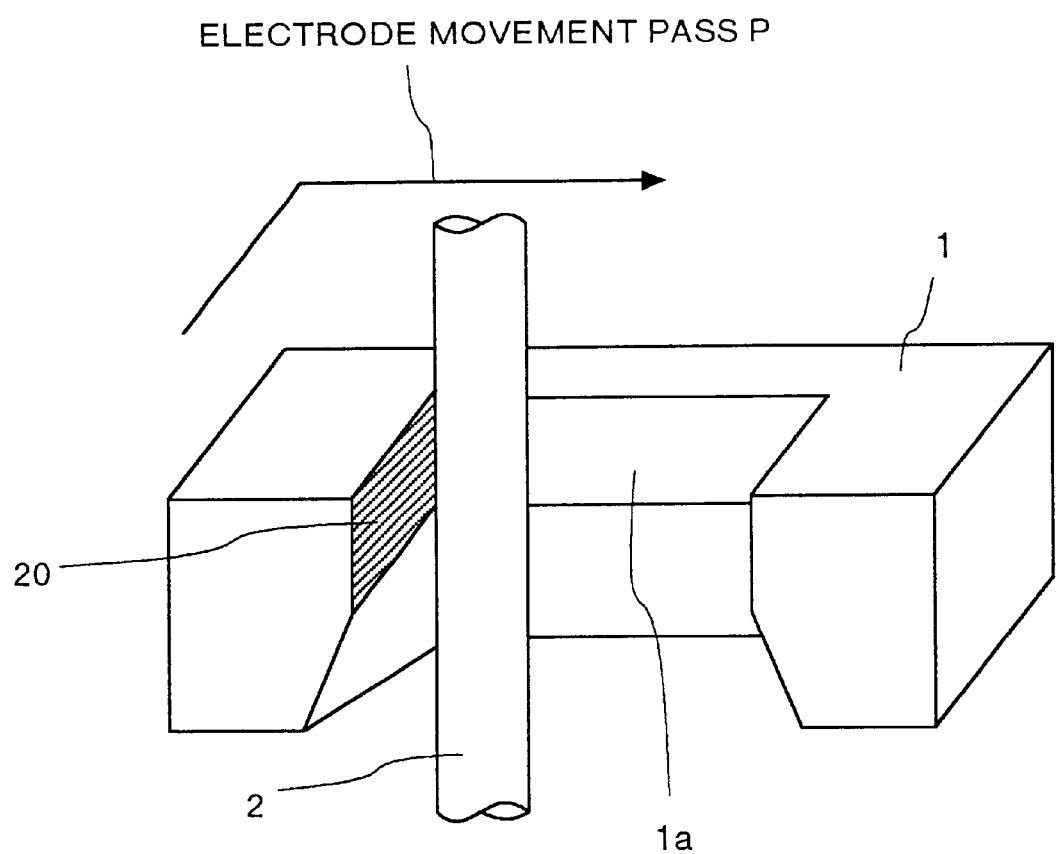
FIG. 5 is an explanatory view of a method by which an electric discharge surface treatment is executed for a cutting blade side face portion of a work piece.

FIG. 5 is an explanatory view of a method by which an electric discharge surface treatment is executed in a cutting blade side face portion 1a of the work piece 1. Each time the covered wire electrode 2 becomes exhausted according to the progress of the electric discharge surface treatment, the electric discharge surface treatment material is stuck on the wire electrode 2a at the electric discharge surface treatment electrode (for example, 6a in FIG. 2) so as to form the covered wire electrode 2. Since the covered wire electrode 2 is fed by means of the wire electrode feed section, the non-exhausted part of the covered wire electrode 2 is constantly used so as to execute the machining. Accordingly, the electrode movement pass of the covered wire electrode 2 (P in FIG. 5) can be similar to the electrode movement pass of the wire electric discharge work. As described above, a hard surface modified layer 20 may be formed in the cutting blade side face portion 1a of the work piece 1 by executing the electric discharge surface treatment by moving the covered wire electrode 2 so as to trace the cutting blade shape of the work piece 1.

Figure 6A:
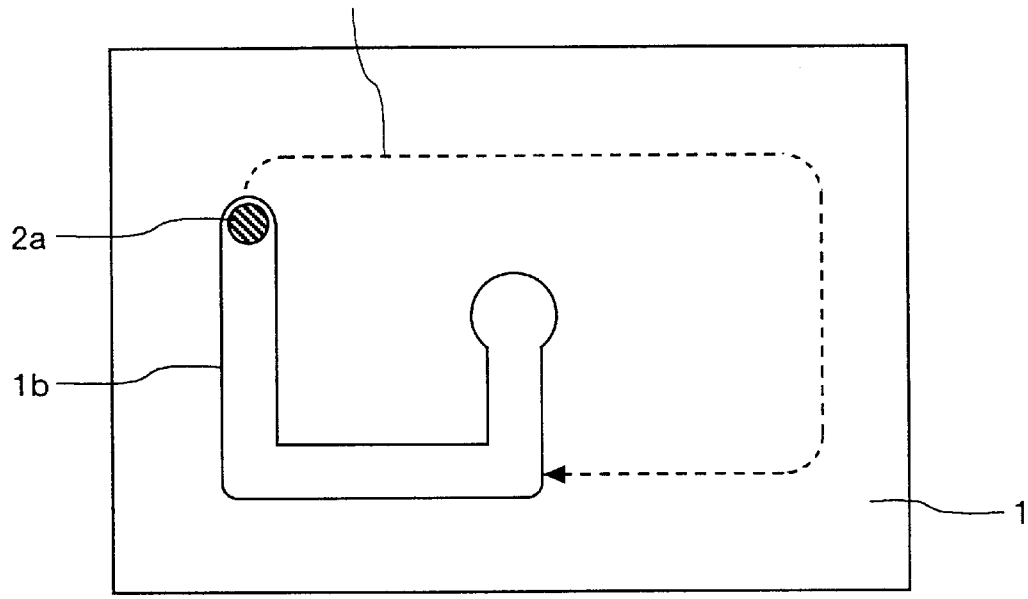
FIG. 6A and FIG. 6B are explanatory views of electrode movement passes.
Figure 6B:
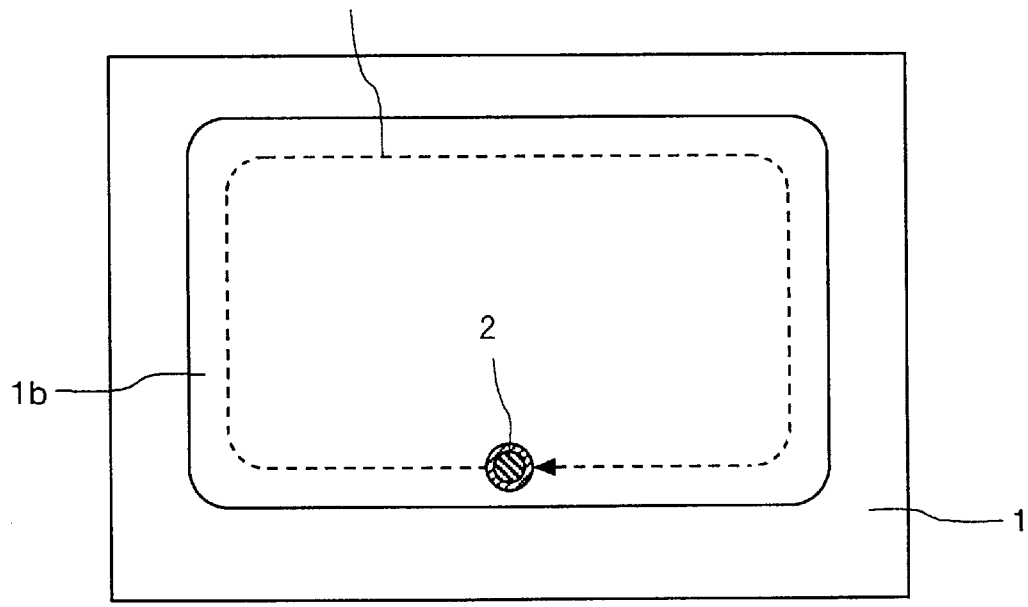

FIG. 6A and FIG. 6B are explanatory views of electrode movement passes, FIG. 6A shows a wire electric discharge machining, and FIG. 6B shows an electric discharge surface treatment. In FIG. 6A of the wire electric discharge machining, the locus movement control section 15 provided inside the numerical control device 14 of FIG. 1 drive controls the X table 8 and the Y table 9 through the X axis drive device and the Y axis drive device which belong to the drive section based on the electrode pass information previously prepared by means of the electrode movement locus generation CAM device 16 and executes the relative movement inside the XY plane of the wire electrode 2a and the work piece 1 so as to finish the work piece 1 into a cutting blade shape. In FIG. 6B of the electric discharge surface treatment, it is necessary to control so as to move the covered wire electrode 2 according to the cutting blade shape 1b of the work piece 1. In this case, the locus movement control section 15 provided inside the numerical control device 14 by means of a method similar to a conventional finish machining for a wire electric discharge machining drive controls the X table 8 and the Y table 9 through the X axis drive device and the Y axis drive device which belong to the drive section based on the electrode pass information previously prepared by means of the electrode movement locus generation CAM device 16 and executes the relative movement inside the XY plane of the covered wire electrode 2 and the work piece 1 so as to execute a locus movement of the covered wire electrode 2 as tracing the cutting blade side face of the work piece 1.

As a result of the formation of a hard surface modified layer on the cutting blade side face portion of a blanking die through the electric discharge surface treatment as the above described method and the execution of a blanking test of a press, the quantity of the die wear of the pressing at 400,000 shots has become ½ or below compared with the case in which the electric discharge surface treatment is not executed. Therefore, it realizes a long lifetime of the die.

The electric discharge surface treatment of the present invention may be applied not only to the type of blanking die but also similarly to a shape (a two dimensional shape, an envelope shape) section which may be processed by a wire electric discharge machining, for example, a cutting edge of an extruding die, a punch, and a twist drill, and a similar effect may be obtained.

The electrode pass program of the electric discharge surface treatment can be easily prepared by utilizing a machining program of a wire electric discharge machining employed in a pre-finish of a work piece 1. Therefore, the arrangement working hours in a machining can be shortened.

Further, since a cutting blade work and an electric discharge surface treatment for the work piece 1 can be processed on the same machine. Therefore, the arrangement working hours in a machining can be shortened greatly.

In the explanation described above, a case is shown in which, while a wire electrode is traveled, an electric discharge surface treatment for a wire electrode and an electric discharge surface treatment for a work piece are executed. However, it is also possible to execute an electric discharge surface treatment to the wire electrode 2a in a state in which the feed of the wire electrode is stopped so as to make a predetermined part the covered wire electrode 2, feed this covered wire electrode 2 to a work piece so as to stop feeding the wire electrode, and execute an electric discharge surface treatment to the work piece 1 by the covered wire electrode 2.

In the machining device by the wire electrode of FIG. 1 or FIG. 2 of the first embodiment, the covered wire electrode 2 can be employed as a grinding tool for the work piece 1. In other words, since the surface modified material or the material 2b to be the source of the surface modified material which is stuck on the wire electrode 2a by the electric discharge surface treatment is a hard coating, a grinding is executed by letting the covered wire electrode 2 and the work piece 1 do a relative movement in the state in which the covered wire electrode 2 to which the hard coating is stuck is pressed to the work piece 1 as a grinding tool. In such a case, also, a machining program similar to the first embodiment may be employed.

In the case in which a grinding is executed for the work piece 1 by the covered wire electrode 2, there is no necessity to supply machining power to the wire electrode and the work piece by a machining power supply device except for the case in which a wiping of the work piece by an electric discharge machining is executed beforehand.

An example of a grinding for the work piece 1 by the covered wire electrode 2 will be shown. For example, the undulation of an electric discharge machining face of the work piece 1 has decreased from about 15 micrometer to about 3 micrometer. Further, a finish machining can be executed on the same machine by the wire electric discharge machining and the grinding to the work piece. Therefore, the arrangement working hours machining can be shortened.

Figure 7:
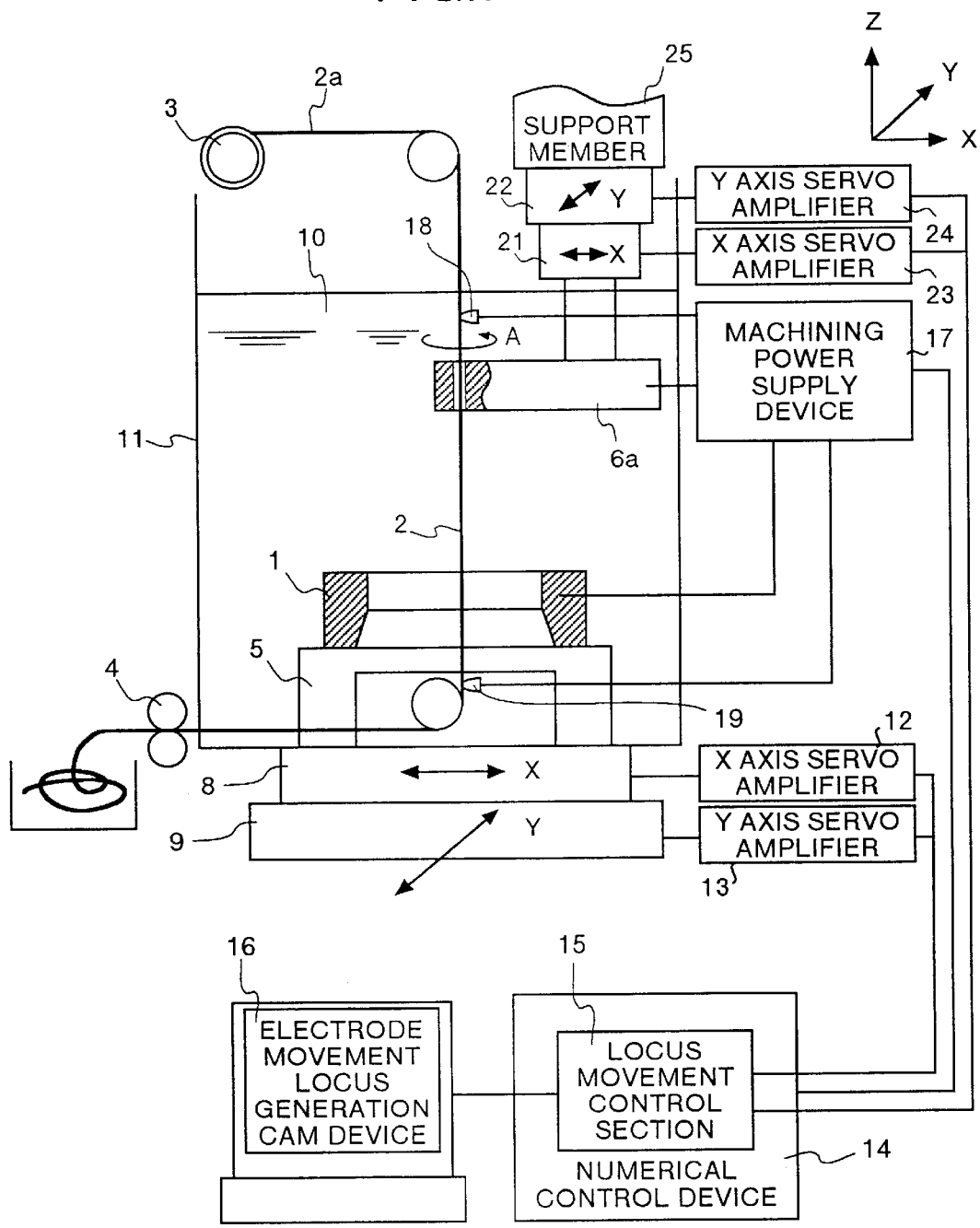
FIG. 7 is a block diagram showing a machining device utilizing a wire electrode according to a third embodiment of the present invention.

FIG. 7 is a block diagram showing a machining device utilizing a wire electrode according to a third embodiment of the present invention. Corresponding numerals to FIG. 2 of the first embodiment show the same or similar parts. In FIG. 7, 21 is an X table for driving an electric discharge surface treatment electrode 6a in the X axis direction, 22 is a Y table which drives the electric discharge surface treatment electrode 6a in the Y axis direction, 23 is an X axis servo amplifier for a not shown X axis drive motor to drive the X table 21, and 24 is a Y axis servo amplifier for a not shown Y axis drive motor to drive the Y table 22. The X axis drive motor, the X axis servo amplifier 23, and the numerical control device 14 and the like constitute an X axis drive device, and the Y axis drive motor, the Y axis servo amplifier 24, and the numerical control device 14 and the like constitute a Y axis drive device. The X axis drive device and the Y axis drive device constitute a drive section for the electric discharge surface treatment electrode 6a. 25 is a support member for the X table 21 and the Y table 22 which place the electric discharge surface treatment electrode 6a.

The wire electrode 2a and the electric discharge surface treatment electrode 6a are capable of a relative movement by the drive section in the constitution of FIG. 7. This constitution differs from that of FIG. 2 of the first embodiment.

In FIG. 2 of the first embodiment, the wire electrode 2a and the electric discharge surface treatment electrode 6a are arranged so as to have a predetermined space. However, in order to arrange the hole diameter of the electric discharge surface treatment electrode 6a so as to have the predetermined space relative to the outer diameter of the wire electrode 2a, it is necessary to improve the machining accuracy of each part for realizing a predetermined positioning accuracy and execute a adjustment work. Since the electric discharge surface treatment electrode 6a becomes exhausted through the electric discharge surface treatment, it is necessary to exchange the electric discharge surface treatment electrode 6a after a predetermined electric discharge surface treatment.

Figure 8A:
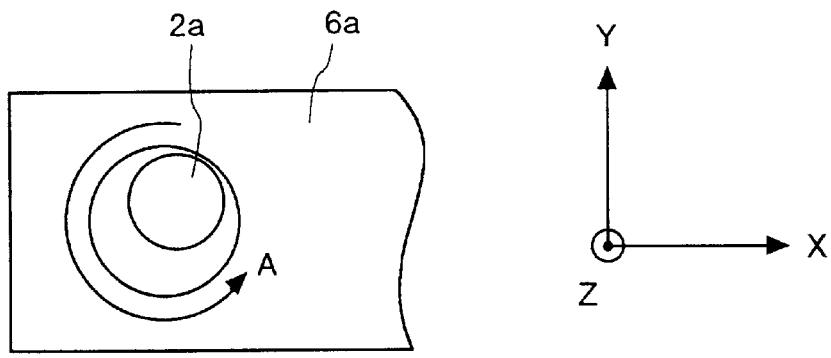
FIG. 8A to FIG. 8C are explanatory views showing operations which swing an electric discharge surface treatment electrode relative to a wire electrode by means of a drive section for the electric discharge surface treatment electrode.
Figure 8B:
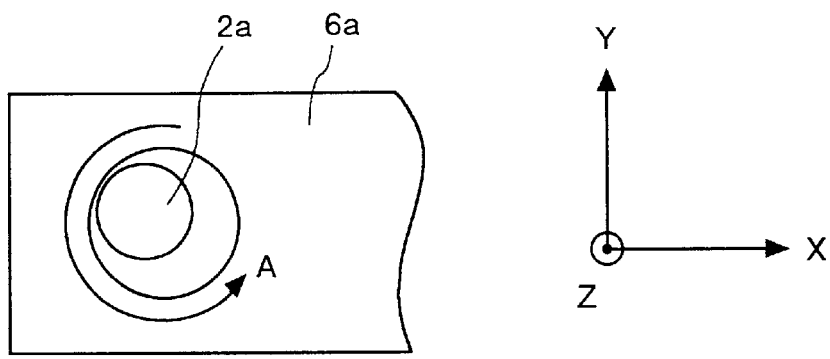
Figure 8C:
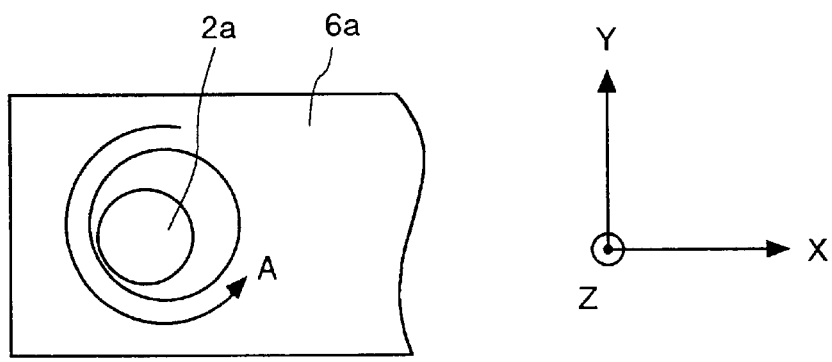
Figure 9A:
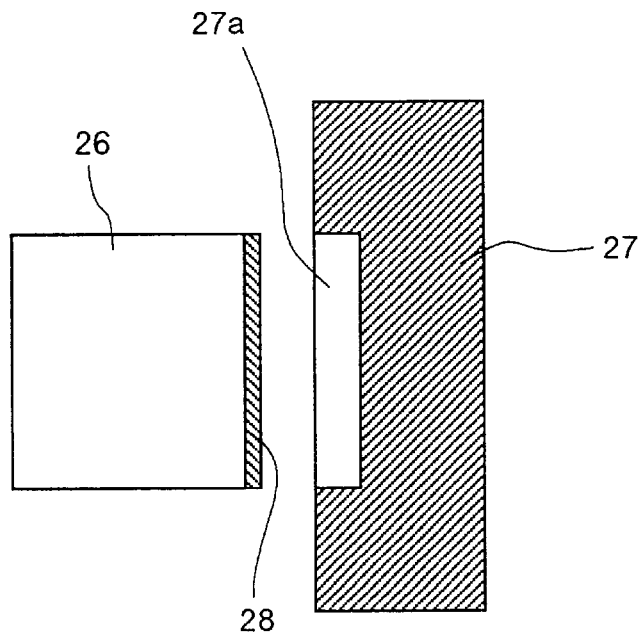
FIG. 9A and FIG. 9B are explanatory views showing conventional electric discharge surface treatment methods.
Figure 9B:
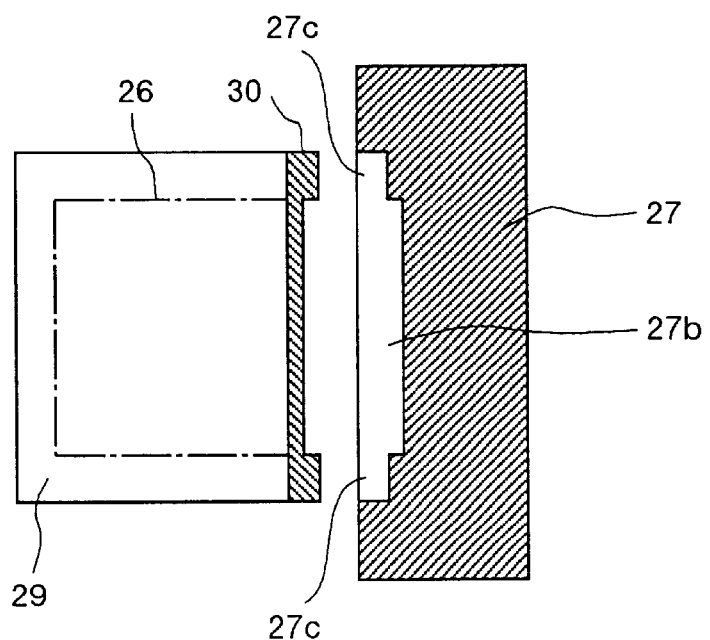

On the other hand, for example, the electric discharge surface treatment is executed while swinging the electric discharge surface treatment electrode 6a relative to the wire electrode 2a by the drive section for the electric discharge surface treatment electrode in the constitution of FIG. 7 as shown in FIG. 8A and FIG. 8B. Therefore, the covered wire electrode 2 can be efficiently formed. Further, the exchange frequency of the electric discharge surface treatment electrode 6a can be decreased greatly.

Since being constituted as described in the above, the present invention has the effects described below.

The machining method by the wire electrode and the device thereof according to the present invention have effects in which the method and the device are suitable for a partial surface modification, specifically for a die or the like, and an uniform surface modified layer of predetermined characteristics can be formed to a work piece by a practical electric discharge surface treatment speed.

Further, there is an effect in which there is no necessity to prepare a plurality of electric discharge surface treatment electrodes corresponding to machining shapes.

Furthermore, the present invention has an effect in which the surface roughness of a work piece such as a die can be reduced through a grinding utilizing a wire electrode provided with an electric discharge surface treatment. Therefore, a high resolution of a work piece can be obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A machining method utilizing a wire electrode comprising:
   a first step in which an electric discharge is generated between said wire electrode and an electric discharge surface treatment electrode made of metal powder or a mixture of metal compound powder or ceramic material powder or a combination of these powders, and a surface modified material or a material to be the source of said surface modified material is stuck on the surface of said wire electrode by the energy of the electric discharge; and
   a second step in which an electric discharge is generated between a work piece and said wire electrode on which the surface modified material or the material to be the source of said surface modified material is stuck, and a surface modified layer is formed on the surface of said work piece by the energy of the electric discharge.

2. The machining method according to claim 1, wherein the first step is executed while said wire electrode and said electric discharge surface treatment electrode are relatively swung inside a vertical plane of a feed direction of said wire electrode.

3. A machining device utilizing a wire electrode comprising:
   a wire electrode feed unit which feeds said wire electrode to a work piece;
   an electric discharge surface treatment electrode composed of metal powder or a mixture of metal compound powder or ceramic material powder or a combination of these powders;
   a drive unit which relatively moves said wire electrode to said work piece; and
   an electric discharge generation unit which supplies machining power to said electric discharge surface treatment electrode and said wire electrode and to said wire electrode and said work piece.

4. A machining device utilizing a wire electrode comprising:
   a wire electrode feed unit feeding the wire electrode to a work piece;
   an electric discharge surface treatment electrode composed of metal powder or a mixture of metal compound powder or ceramic material powder or a combination of these powders;
   a drive unit which relatively moves said wire electrode to said work piece; and
   an electric discharge generation unit which supplies machining power to said electric discharge surface treatment electrode and said wire electrode.

5. A machining device utilizing a wire electrode comprising:
   a wire electrode feed unit which feeds said wire electrode to a work piece;
   an electric discharge surface treatment electrode composed of metal powder or a mixture of metal compound powder or ceramic material powder or a combination of these powders;
   a first drive unit which relatively moves said electric discharge surface treatment electrode to said wire electrode inside a vertical plane of a feed direction of said wire electrode by said wire electrode feed unit;
   a second drive unit which relatively moves said wire electrode to said work piece; and
   an electric discharge generation unit which supplies machining power to said electric discharge surface treatment electrode and said wire electrode and to said wire electrode and said work piece.

6. A machining device utilizing a wire electrode comprising:
   a wire electrode feed unit which feeds said wire electrode to a work piece;
   an electric discharge surface treatment electrode composed of metal powder or a mixture of metal compound powder or ceramic material powder or a combination of these powders;
   a first drive unit which relatively moves said electric discharge surface treatment electrode to said wire electrode inside a vertical plane of a feed direction of said wire electrode by said wire electrode feed unit;
   a second drive unit which relatively moves said wire electrode to the work piece; and
   an electric discharge generation unit which supplies work power to said electric discharge surface treatment electrode and said wire electrode.

* * * * *